(No Model.)
A. W. INGRAHAM.
RAILWAY VELOCIPEDE.
No. 352,952.  Patented Nov. 23, 1886.
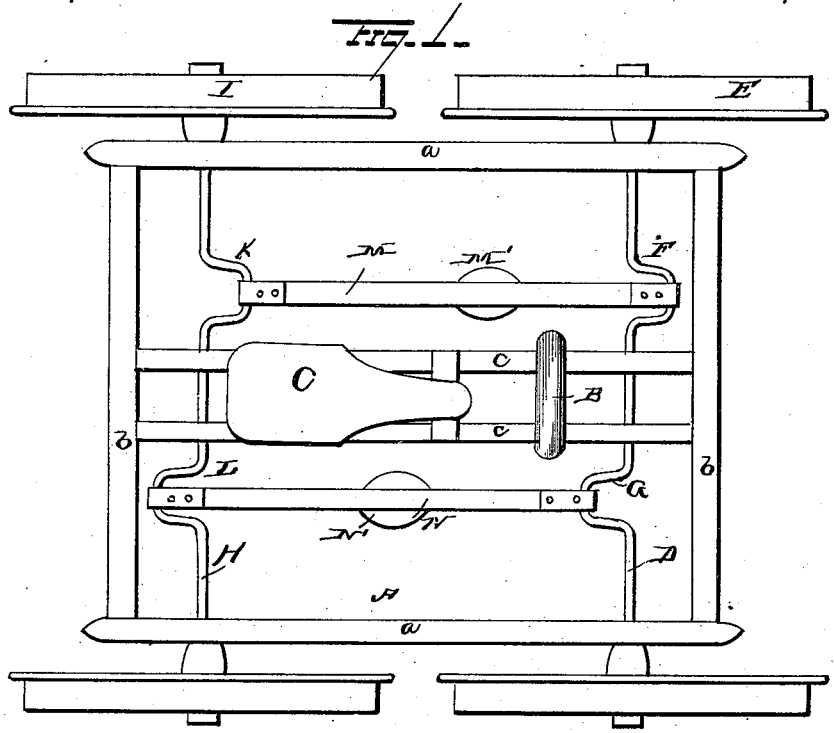
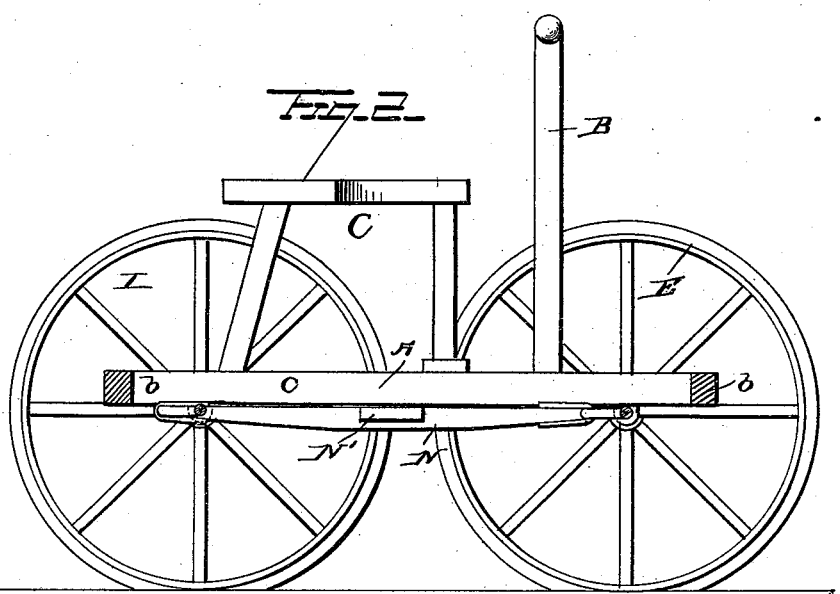
Witnesses  Inventor
  Alfred W. Ingraham
By his Attorneys

UNITED STATES PATENT OFFICE.

ALFRED W. INGRAHAM, OF THURMAN, NEW YORK.

RAILWAY-VELOCIPEDE.

SPECIFICATION forming part of Letters Patent No. 352,952, dated November 23, 1886.

Application filed June 11, 1886. Serial No. 204,863. (No model.)

*To all whom it may concern:*

Be it known that I, ALFRED W. INGRAHAM, a citizen of the United States, residing at Thurman, in the county of Warren and State of New York, have invented a new and useful Improvement in Railroad-Velocipedes, of which the following is a specification.

My invention relates to an improvement in railroad-velocipedes; and it consists in the peculiar construction and combination of devices that will be more fully set forth hereinafter, and particularly pointed out in the claim.

In the drawings, Figure 1 is a top plan view of my invention. Fig. 2 is a longitudinal sectional view of the same.

A represents a rectangular frame, comprising the side bars, $a$, the end bars, $b$, connecting the ends of the side bars, and the bars $c$, extending longitudinally on opposite sides of the center of the frame, and connected at their front and rear ends to the end bars, $b$. To the bars $c$, near their front ends, is attached a vertical standard, B, and in rear of the said standard, and also supported upon the said bars $c$, is a seat, C.

D represents a transverse shaft, which is journaled on the under side of the frame A, near the front end thereof. To the ends of the said shaft are attached wheels E, and cranks F and G are formed in the said shaft, one on each side of the bars $c$, the said cranks extending in opposite directions from each other.

H represents a transverse shaft, which is journaled on the under side of the frame A, near the rear end thereof. The said shaft is provided at its extremities with wheels I. Cranks K and L are formed in the shaft H, and extend in opposite directions from each other.

M represents the connecting-rod, which extends horizontally from the crank F to the crank K, and is connected to the said cranks. At the center of the said rod is a pedal, M'.

N represents a similar connecting-rod, provided at its center with a pedal, N', and having its extremities attached to the cranks G and L. It will thus be seen that as the velocipede rolls along the connecting-rods M and N will be alternately reciprocated and raised and lowered in opposite directions.

The operation of my invention is as follows: The operator seats himself upon the seat C, grasps the handle attached to the standard B, and places his feet upon the pedals. He then bears downwardly upon one of the pedals with one foot, and at the same time moves his foot rearwardly, while he raises and moves the other foot forwardly, thereby imparting a reciprocating and an up-and-down movement to the connecting-rods, and causing them to rotate the shaft and guide the machine forward. The wheels are here shown as provided with flanges, in order to adapt them to a railway-track; but the flanges may be dispensed with if it is desired to use the machine over a common road.

Having thus described my invention, I claim—

The combination, in a velocipede, of the frame A, having the seat C, the shaft D, journaled at one end of the frame, and having the cranks F and G, extending in opposite directions, and the wheels E, the shaft H, journaled in the rear end of the frame A and having the oppositely-extending cranks K and L, and the wheels I, the rod M, connecting the cranks K and F, and having the pedal M', and the rod N, connecting the cranks G and L, and having the pedal M', the said rods M and N being arranged on opposite sides of the seat and at a suitable distance below the same, substantially as described.

In testimony that I claim the foregoing as my own I have hereto affixed my signature in presence of two witnesses.

ALFRED W. INGRAHAM.

Witnesses:
L. C. ALDRICH,
W. I. INGRAHAM.